United States Patent [19]

Tsutsui et al.

[11] Patent Number: 5,087,974
[45] Date of Patent: Feb. 11, 1992

[54] IMAGE PROCESSING WITH HORIZONTAL BLANKING WIDTH CORRECTION

[75] Inventors: Takeo Tsutsui, Tokyo; Teruo Takayanagi, Saitama; Yasushi Kimura; Nozomu Hasegawa, both of Tokyo, all of Japan

[73] Assignee: Nippon Hoso Kyokai, Tokyo, Japan

[21] Appl. No.: 578,271

[22] Filed: Sep. 6, 1990

[30] Foreign Application Priority Data

Sep. 6, 1989 [JP] Japan ................................. 1-229123

[51] Int. Cl.⁵ ............................................ H04N 3/223
[52] U.S. Cl. ..................................... 358/180; 358/160
[58] Field of Search ............... 358/180, 140, 160, 166, 358/167

[56] References Cited

U.S. PATENT DOCUMENTS 4,729,012  3/1988  Jose et al. ........................ 358/180 X
4,847,676  7/1989  Oliphant et al. ................. 358/180 X
4,951,125  8/1990  Kojima et al. .................. 358/180 X Primary Examiner—Victor R. Kostak
Attorney, Agent, or Firm—Sandler, Greenblum, & Bernstein

[57] ABSTRACT

A method and an apparatus for image processing capable of solving the problem of out of standard image signals, with a least amount of a deterioration of the image quality and a distortion of the image produced at the central region of the image. In this apparatus, the out of standard image signals having missing portions are treated by a horizontal blanking width correction process in which only those parts of the video signals corresponding to horizontally peripheral regions of the image are enlarged to supplement the missing portions of the video signals, and then the parts of the video signals corresponding to the central region of the image and the horizontally peripheral regions of the image are combined to obtain full video signals without missing portions.

6 Claims, 3 Drawing Sheets

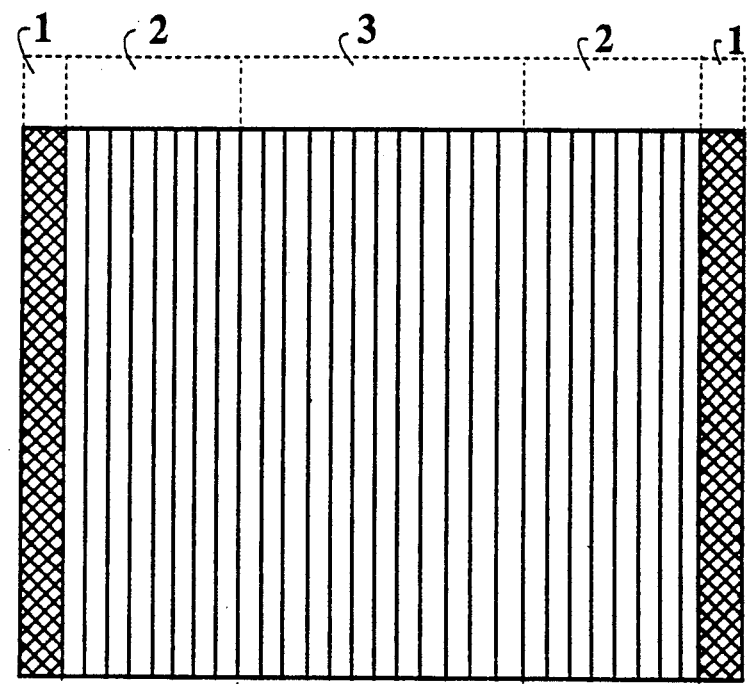
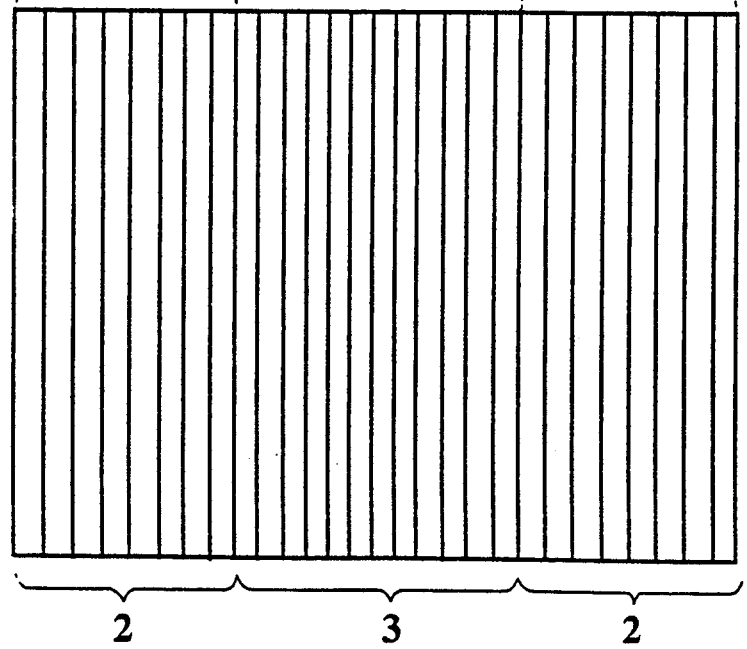

IMAGE PROCESSING WITH HORIZONTAL BLANKING WIDTH CORRECTION

BACKGROUND OF THE INVENTION

1. Field of the Invention

The present invention relates to an image processing of video signals useful for an application to TV.

2. Description of the Background Art

In the art of image processing, in conjunction with the recent development of the digital technique, it become possible to improve the image quality by means of various complex processings using such a device as a special image effect device. On the other hand, the repeated applications of such a digital technique are creating a problem of a generation of so called out of standard image signals such as those in which end portions of the image are missing.

Conventionally, this problem is coped by enlarging the entire image uniformly using a special image effect device, so as to convert the defective out of standard image signals into an acceptable standard image signals.

However, in this method of uniformly enlarging the entire image by a certain magnification rate, there has been a problem that a deterioration of the image quality and a distortion of the image are spread all over the entire image. Also, when the enlargement is performed only in a horizontal direction, a distortion is still produced on the image, due to the change in a vertical/horizontal ratio. In other words, in this method of uniformly enlarging the entire image by a certain magnification rate, the deterioration of the image quality and the distortion of the image are introduced into more important central region of the image as well less important peripheral regions of the image, resulting in a production of images which are less pleasing to a viewer.

SUMMARY OF THE INVENTION

It is therefore an object of the present invention to provide a method and an apparatus for image processing capable of solving the problem of out of standard image signals, with less deterioration of the image quality and distortion of the image produced at the central region of the image, so that it becomes possible to obtain a fully acceptable standard image signals, in which the perception of the deterioration of the image quality and the distortion of the image by a viewer is impossible.

According to one aspect of the present invention there is provided an image processing apparatus for processing video signals, comprising: means for performing digital processings on the video signals; and horizontal blanking width correction means for treating those video signals which have missing portions as a result of the digital processings, including: means for separating a part of the video signals corresponding to a central region of an image given by the video signals from other parts; means for enlarging the other parts of the video signals corresponding to horizontally peripheral regions of the image, to supplement the missing portions of the video signals; and means for combining the part of the video signals corresponding to the central region of the image separated by the separating means and the other parts of the video signals corresponding to horizontally peripheral regions of the image obtained by the enlarging means, to obtain full video signals without missing portions.

According to another aspect of the present invention there is provided a method of image processing for processing video signals, comprising the steps of: performing digital processings on the video signals; treating those video signals which have missing portions as a result of the digital processings by a horizontal blanking width correction process, the horizontal blanking width correction process including the steps of: separating a part of the video signals corresponding to a central region of an image given by the video signals from other parts; enlarging the other parts of the video signals corresponding to horizontally peripheral regions of the image, to supplement the missing portions of the video signals; and combining the part of the video signals corresponding to the central region of the image separated at the separating step and the other parts of the video signals corresponding to horizontally peripheral regions of the image obtained at the enlarging step, to obtain full video signals without missing portions.

Other features and advantages of the present invention will become apparent from the following description taken in conjunction with the accompanying drawings.

BRIEF DESCRIPTION OF THE DRAWINGS

FIGS. 1(A) and (B) are two dimensional displays of images, without and with the horizontal blanking correction, respectively, according to the present invention.

DETAILED DESCRIPTION OF THE PREFERRED EMBODIMENTS

Now, an image processing according to the present invention will be described with references to the drawings.

Here, it is assumed that, for input signals obtained by an imaging device, various digital processings using such a device as a special image effect device have been performed in a conventional manner, and some out of standard image signals in which end portions of the image are missing have been produced.

According to the present invention, out of standard image signals in which end portions of the image are missing are dealt with by a horizontal blanking width correction process as follows. Namely, the image shown in FIG. 1(A), given by these out of standard image signals, with missing end portions 1, is divided into horizontally peripheral regions 2 and central region 3, and then as shown in FIG. 1(B), the missing portions 1 are supplemented by enlarging the horizontally peripheral regions 2 only, without affecting the image of the central region 3. Thus, in the horizontally peripheral regions 2, the interval between adjacent vertical lines are widened, whereas in the central region 3, this interval is unchanged. The full standard image signals are obtained by combining the unaffected central region 3 and the enlarged horizontally peripheral regions 2.

Figure 2:
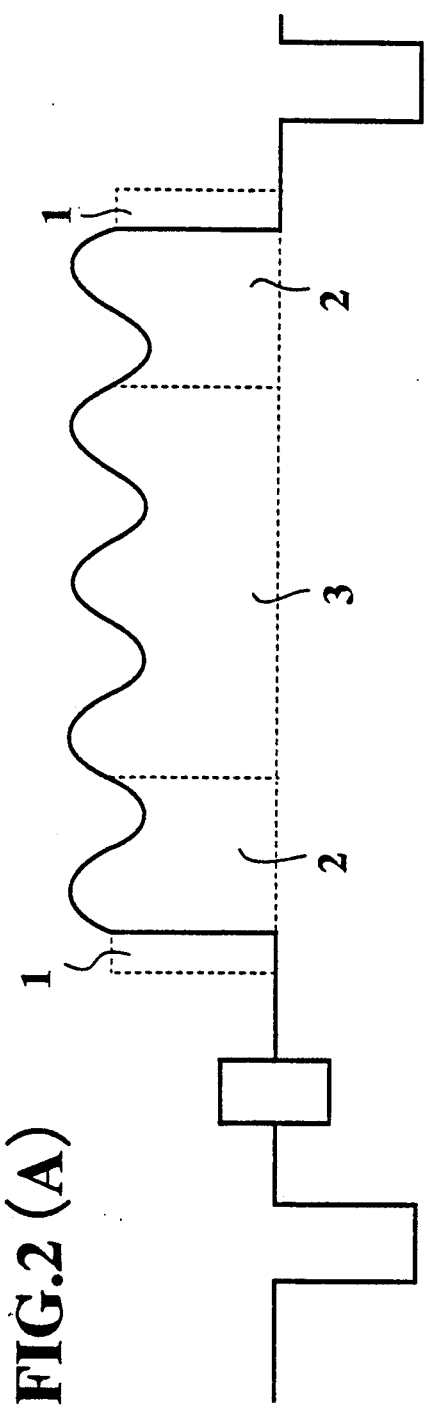
FIGS. 2(A) and (B) are diagrams of a horizontal signal as a function of time, without and with the horizontal blanking correction, respectively, according to the present invention.
Figure 2:
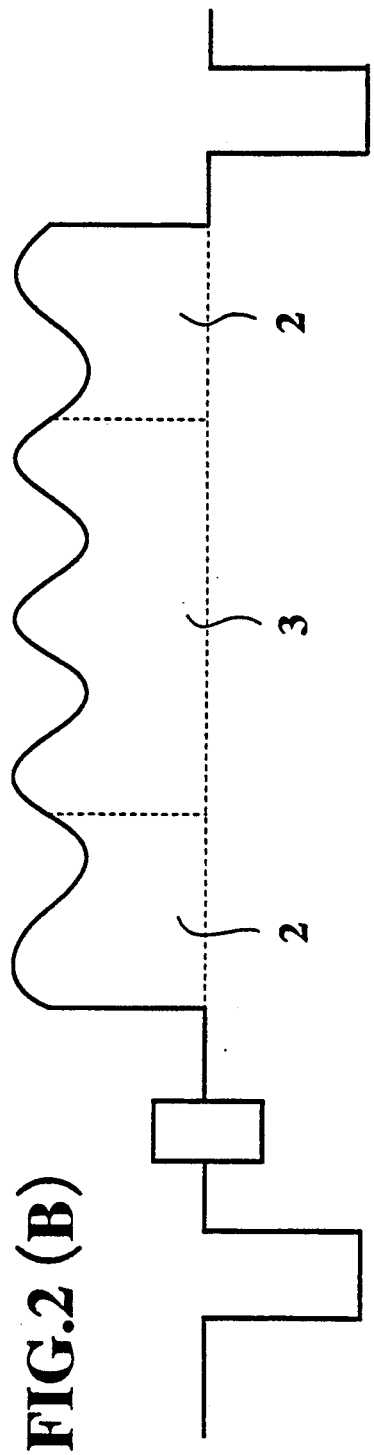

In terms of the horizontal signals as functions of time, this process of horizontal blanking width correction appears as shown in FIGS. 2(A) and (B). Namely, the horizontal signal of the out of standard image signals, with missing end portions 1, in a form of a sine wave as shown in FIG. 1(A) is divided into horizontally peripheral regions 2 and a central region 3, and then as shown in FIG. 2(B), the missing portions 1 are supplemented by enlarging periods for the horizontally peripheral regions 2 into immediately preceding and immediately following regions, without affecting the image of the central region 3. As already described above, the full standard image signals are obtained by combining the unaffected central region 3 and the enlarged horizontally peripheral regions 2.

As a result, a deterioration of the image quality and a distortion of the image are not introduced into more important central region 3 of the image, but limited to less important peripheral regions of the image. Since in a case of TV, the peripheral regions 2 of the image normally do not appear on a TV display screen at all, or, even if they appear on the TV display screen, they have only a minor contribution to the overall image quality of the entire image, a production of satisfactory images become possible according to the present invention.

Figure 3:
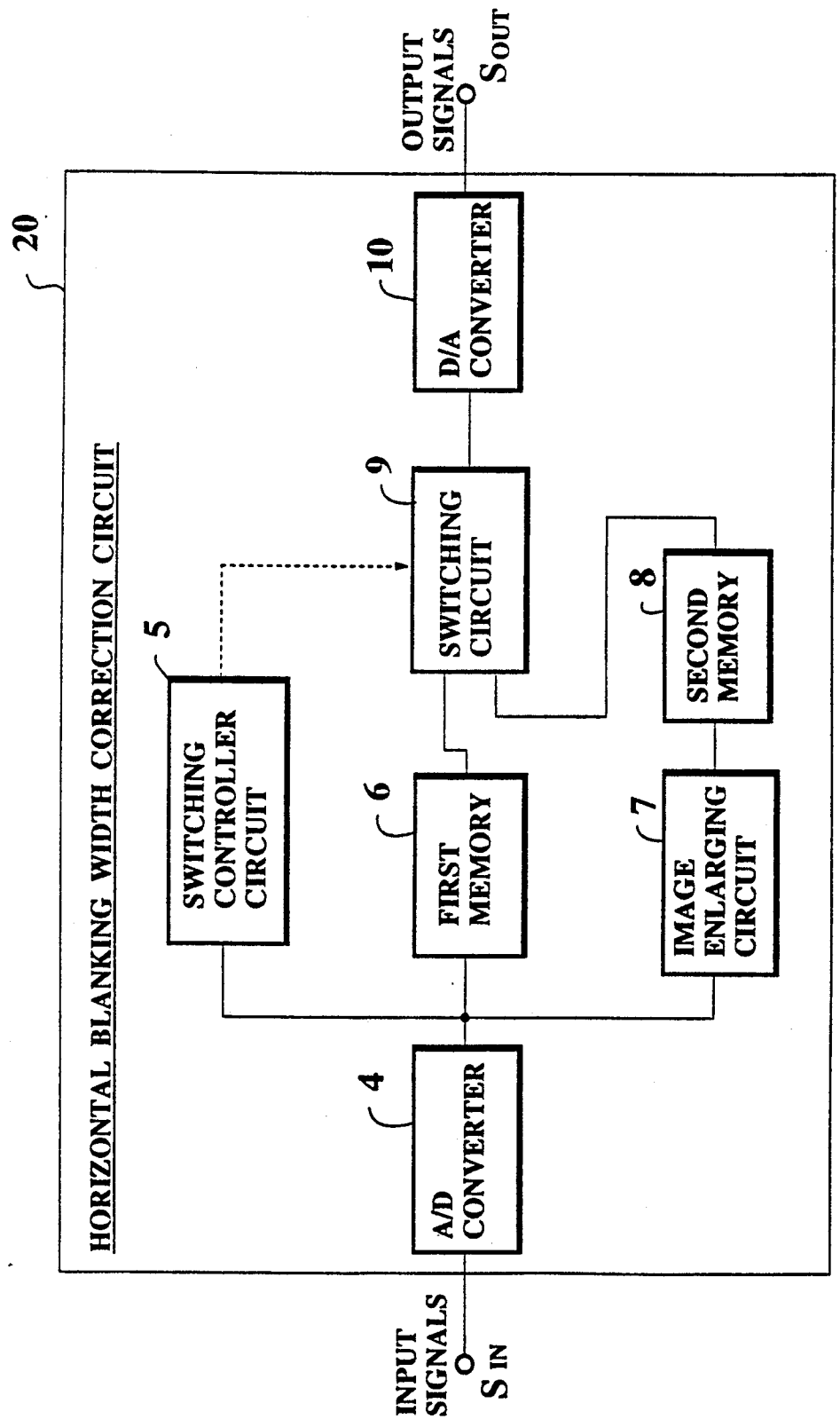
FIG. 3 is a schematic block diagram of one embodiment of a horizontal blanking width correction circuit to be utilized by the present invention.

The horizontal blanking width correction process described above can be achieved by using a horizontal blanking width correction circuit shown in FIG. 3.

This horizontal blanking width correction circuit 20 comprises an A/D converter 4 for converting input signals $S_{IN}$ obtained from an imaging device (not shown) or other image processing device (not shown) from analog forms to digital forms, a first memory 6 for memorizing the signals corresponding to the central regions 3, an enlarging circuit 7 for enlarging the signals corresponding to the horizontally peripheral regions 2 in a manner described above, a second memory 8 for memorizing the enlarged signals for the horizontally peripheral regions 2 obtained by the enlarging circuit 7, a switching circuit 9 for selectively reading out the signals memorized in the first and second memories 6 and 8 to construct full standard image signals without missing portions 1, a switching controller circuit 5 for controlling the operation of the switching circuit 9, and a D/A converter for converting the signals obtained by the switching circuit 9 from digital form into analog forms $S_{OUT}$ appropriately adapted for a display device (not shown) of a system.

Thus, by feeding the out of standard image signals resulting from various digital processings as the input signals $S_{IN}$ of FIG. 3, the horizontal blanking width correction process according to the present invention described above can be performed.

As described, according to the present invention, it becomes possible to provide a method and an apparatus for image processing capable of solving the problem of out of standard image signals, with a least amount of a deterioration of the image quality and a distortion of the image produced at the central region of the image, by using the horizontal blanking width correction process.

It is to be noted that many modifications and variations of the above embodiment may be made without departing from the novel and advantageous features of the present invention. Accordingly, all such modifications and variations are intended to be included within the scope of the appended claims.

What is claimed is:

1. An image processing apparatus for processing video signals, comprising:
    means for performing digital processings on the video signals; and
    horizontal blanking width correction means for treating those video signals which have missing portions as a result of the digital processings, including:
        means for separating a part of the video signals corresponding to a central region of an image given by the video signals from other parts;
        means for enlarging the other parts of the video signals corresponding to horizontally peripheral regions of the image, to supplement the missing portions of the video signals; and
        means for combining the part of the video signals corresponding to the central region of the image separated by the separating means and the other parts of the video signals corresponding to horizontally peripheral regions of the image obtained by the enlarging means, to obtain full video signals without missing portions.

2. The apparatus of claim 1, wherein the central region of the image is a region which actually appears on a TV display screen.

3. The apparatus of claim 1, wherein the enlarging means enlarges the other parts of the video signals into regions immediately preceding and immediately following the other parts in time.

4. A method of image processing for processing video signals, comprising the steps of:
    performing digital processings on the video signals;
    treating those video signals which have missing portions as a result of the digital processings by a horizontal blanking width correction process, the horizontal blanking width correction process inlcuding the steps of:
        separating a part of the video signals corresponding to a central region of an image given by the video signals from other parts;
        enlarging the other parts of the video signals corresponding to horizontally peripheral regions of the image, to supplement the missing portions of the video signals; and
        combining the part of the video signals corresponding to the central region of the image separated at the separating step and the other parts of the video signals corresponding to horizontally peripheral regions of the image obtained at the enlarging step, to obtain full video signals without missing portions.

5. The method of claim 4, wherein the central region of the image is a region which actually appears on a TV display screen.

6. The method of claim 4, wherein at the enlarging step, the other parts of the video signals are enlarged into regions immediately preceding and immediately following the other parts in time.

* * * * *

UNITED STATES PATENT AND TRADEMARK OFFICE
CERTIFICATE OF CORRECTION

PATENT NO. : 5,087,974
DATED : February 11, 1992
INVENTOR(S) : T. TSUTSUI et al.

It is certified that error appears in the above-indentified patent and that said Letters Patent is hereby corrected as shown below:

At column 1, line 11, after "it" insert ---has---.
At column 1, line 19, after "coped" insert ---with---.
At column 1, line 33, after "into" insert ---the---.
At column 1, line 34, after "well" insert ---as the---.
At column 1, line 36, change "are" to ---is---.
At column 1, line 45, delete "a".
At column 2, line 47, change "image are" to ---image that are---.
At column 3, line 21, change "become" to ---becomes---.
At column 4, line 39 (claim 4, line 7), change "inlcuding" to ---including---.

Signed and Sealed this

Fifth Day of December, 1995

Attest:

BRUCE LEHMAN

Attesting Officer

Commissioner of Patents and Trademarks